(12) United States Patent
Dube et al.

(10) Patent No.: US 8,140,984 B2
(45) Date of Patent: Mar. 20, 2012

(54) METHOD AND APPARATUS FOR DOCUMENT BROWSING

(75) Inventors: Parijat Dube, Yorktown Heights, NY (US); David A. George, Somers, NY (US); Raymond B. Jennings, III, Ossining, NY (US); Malgorzata Elzbieta Stys, Purdys, NY (US)

(73) Assignee: International Business Machines Corporation, Armok, NY (US)

( * ) Notice: Subject to any disclaimer, the term of this patent is extended or adjusted under 35 U.S.C. 154(b) by 550 days.

(21) Appl. No.: 11/694,161

(22) Filed: Mar. 30, 2007

(65) Prior Publication Data
US 2008/0244420 A1    Oct. 2, 2008

(51) Int. Cl.
*G06F 3/00* (2006.01)
(52) U.S. Cl. .................. 715/760; 715/205; 715/208
(58) Field of Classification Search .................. 715/760, 715/205, 208
See application file for complete search history.

(56) References Cited

U.S. PATENT DOCUMENTS

| 5,890,172 | A | * | 3/1999 | Borman et al. | 715/205 |
| 2002/0129226 | A1 | * | 9/2002 | Eisen et al. | 712/228 |
| 2004/0205514 | A1 | * | 10/2004 | Sommerer et al. | 715/501.1 |
| 2004/0210830 | A1 | * | 10/2004 | Cote et al. | 715/501.1 |
| 2006/0069617 | A1 | * | 3/2006 | Milener et al. | 705/14 |

* cited by examiner

*Primary Examiner* — Boris Pesin
*Assistant Examiner* — Daeho Song
(74) *Attorney, Agent, or Firm* — Scully, Scott, Murphy & Presser, P.C.

(57) ABSTRACT

A method, system and program storage device for browsing hyperlinked documents are provided. A method in one aspect may include enabling navigating from a document having a plurality of hyperlinks to a document associated with one of said plurality of hyperlinks; and enabling navigating directly from said document associated with one of said plurality of hyperlinks to another document associated with another one of said plurality of hyperlinks using one or more of a plurality of defined elements. System and program storage device for performing the above methods are also provided.

20 Claims, 8 Drawing Sheets

METHOD AND APPARATUS FOR DOCUMENT BROWSING

FIELD OF THE INVENTION

The present invention relates generally to document browsing.

BACKGROUND OF THE INVENTION

Document browsing such as web browsing constitutes a major portion of Internet usage by individuals and user experience with browsers is the basic metric in the choice of web browsers. Over the past decade, a number of web browsers such as Microsoft Internet Explorer, Firefox, Netscape, AOL Explorer etc. emerged with oft-times intense competition for the user audience. Many outstanding features have surfaced, including toolbars, plug-ins, shortcut maintenance and even built-in editing and composing. Most recently, tabbed menus were introduced for maintaining simultaneous contexts. Despite those improvements, the user has not been adequately supported from a time/motion vantage point. For example, a major flaw is the requirement for the most common repetitive motion circumstance: the browsing of adjacent hyperlinks in a web page. The user "clicks" a hyperlink to follow a news article in a list area containing multiple news articles. It is necessary to use the back button before progressing to other articles in the list. Furthermore, if the list is generated from web directory browsing, there is no provision to automatically setup a "screen show" mode to allow the user to casually inspect items, such as pictures without laborious interaction.

FIG. 1 shows prior art web browser displayed page. In a typical web browser system 101, a user interacts with a dash panel 103 to specify navigations, specified as Uniform Resource Locators (URLs) to selected web sites. The process of navigation instructs the facility of the web browser to load a target URL in the manner conventional in the art. The invention is not limited to the specific protocol or versions of protocols to accomplish this. The typical target page is displayed in the main frame of the browser 104. Certain navigation enablement is allowed for example, for navigating to prior pages 102 and previously visited (in the forward direction) 103 pages. Logically, these navigation means can be disabled for use until circumstances permit the "Back" or "Forward" navigation buttons. As is typical of web pages there can be areas wherein clicking can instigate a navigation to a URL. Common text and graphic locations of this nature are called hyperlinks 105. The invention is not limited to the placement or physical proximity of hyperlinks listed or embedded in a Web page. It is expected that the user recognizes a list of one kind or another and may wish to sequentially visit said hyperlinks in an orderly manner. That manner may be performed manually and/or by a passive "screen-show" type of mechanism.

FIG. 2 illustrates the prior art as it applies to a common navigation process. The web browser 201 provides at least one hyperlink of interest 202. In the example illustrated in FIG. 2, there are at least two hyperlinks of interest, 202 and 209. Clicking a first hyperlink 202 causes navigation 203 of the web browser to a new target page 204 or section. In this invention, a hyperlink can refer to a distinct URL that leads on current page or off-page. The invention is not limited to the real target for a hyperlink. It will operate properly according to the specification of the hyperlink. After viewing said web page, the user can use the "Back" button 205 to navigate to the earlier web page 201, thus revisiting it. Only then is the next target hyperlink visible 209 for the user to click 206 to invoke the display of another article of web page 207. To advance to additional web pages, the user may again return to the primal page 201 via clicking on back navigation 208, and continue the process.

BRIEF SUMMARY OF THE INVENTION

A method, system and program storage device for browsing hyperlinked documents are provided. A method in one aspect may include enabling navigating from a document having a plurality of hyperlinks to a document associated with one of said plurality of hyperlinks; and enabling navigating directly from said document associated with one of said plurality of hyperlinks to another document associated with another one of said plurality of hyperlinks using one or more of a plurality of defined elements. System and program storage device for performing the above methods are also provided.

Further features as well as the structure and operation of various embodiments are described in detail below with reference to the accompanying drawings. In the drawings, like reference numbers indicate identical or functionally similar elements.

DETAILED DESCRIPTION

A method and apparatus of the present disclosure in embodiment allows a user to automatically enter a mode wherein a hyperlink on a selected web page can be activated and subsequently obtained and displayed by the browser. Additionally, the browser may be in a state wherein the list of hyperlinks of said page are remembered such that subsequently depressing assigned navigations keys may cause: 1) pop-up to the higher level as is customary; 2) navigate to the upper web page's next defined hyperlink, and/or 3) navigate to the upper web page's prior defined hyperlink. In the latter two defined steps, the step of navigating "back" to reach the upper web page again, then selecting the identified hyperlink may be avoided. The method and apparatus of the present disclosure may be useful for browsing photo libraries, news articles that are listed on a web page, and any similar case, in which there are links clustered in any fashion on a web page. The system also permits nesting the operation such that the user may select the hyperlink leading to another web page containing hyperlinks and in like fashion allows "diving" into the depths of pages and forward and reverse navigation.

Figure 1:
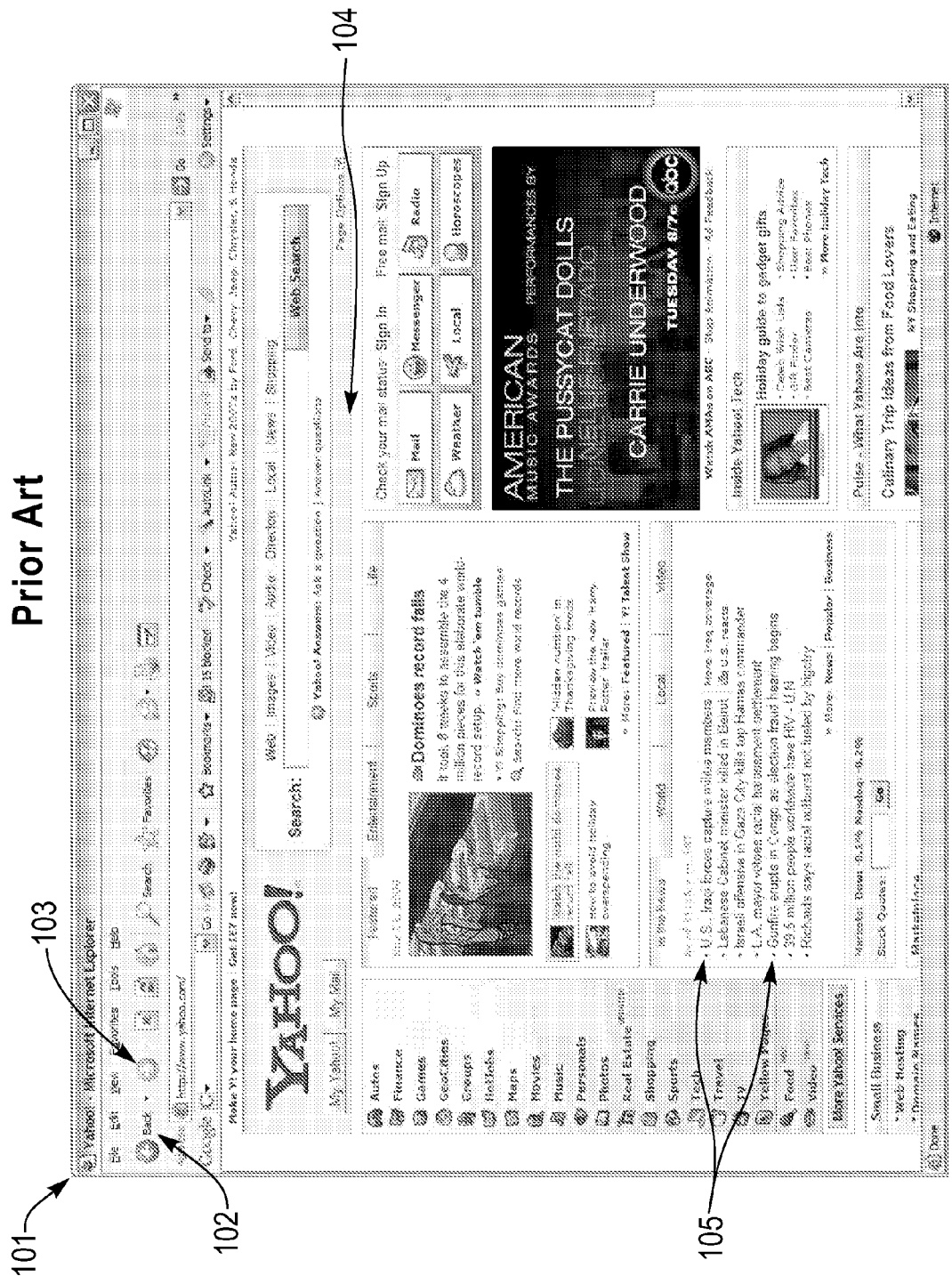
FIG. 1 shows a prior art rendition of a typical browser dialog that provides the selection and display of web content.
Figure 2:
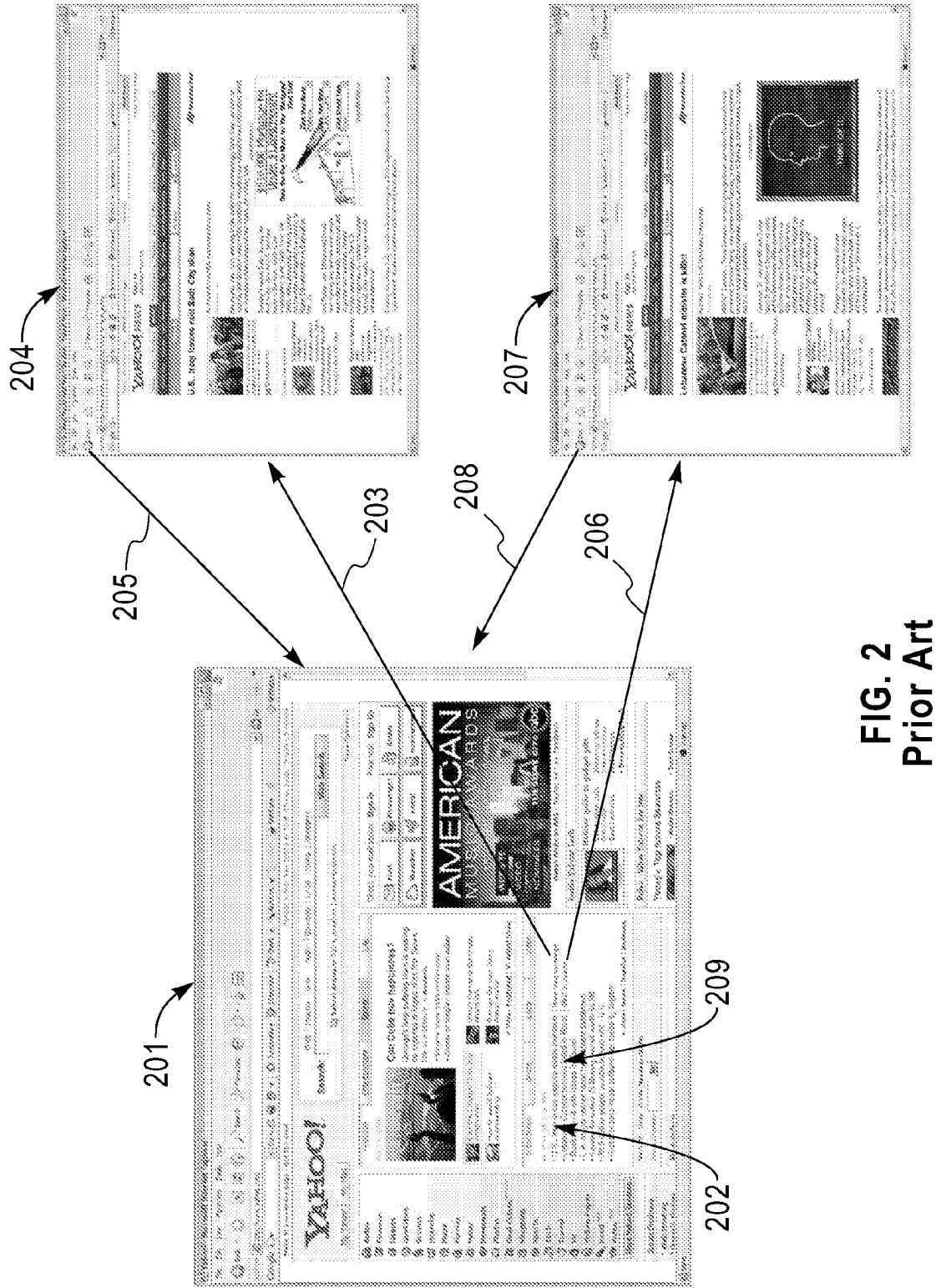
FIG. 2 illustrates a typical browser usage as in the prior art for use in perusing available hyperlinks on a typical web page.
Figure 3:
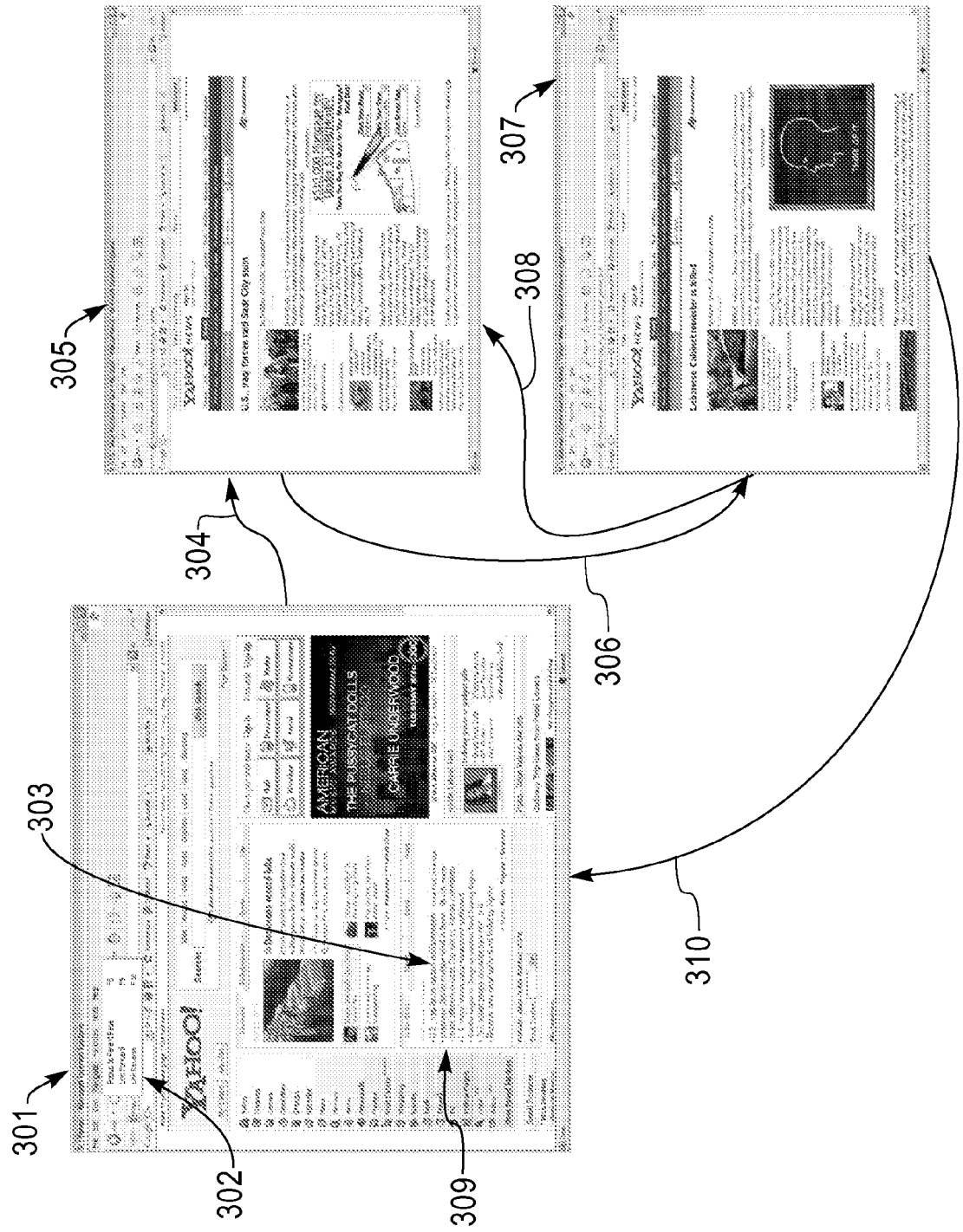
FIG. 3 illustrates web browser page navigation in one embodiment of the present disclosure.

FIG. 3 illustrates web browser page navigation using a method of the present disclosure in one embodiment. The navigation process shown in FIG. 3 allows a user to visit successive hyperlinks by providing a link function 302. The invoked web browser 301 displays a page with at least two hyperlinks of interest 303 and 309. Selecting a first hyperlink 303, the user sees a target page 305 subsequent browser navigation action 304, then, depressing a defined key (for example, a function key such as F5) or combination of keys would allow the navigation 306 to the primal page's next hyperlink target 307 without the repeated encumbering navigation to the primal page each time. Similarly, while viewing the target 307 the user can, by depressing a defined key (for example, a function key such as F9) or combination of keys, cause navigation 308 to the preceding page 305 again. A third action (for example, depressing the "Esc" key) can cause navigation 310 from any sibling page to the higher page containing the list of hyperlinks 301. This is called a "popup to parent page". The standard navigation keys 102, 103 would simply return to a prior-shown web page in the manner consistent with the current art.

Figure 7:
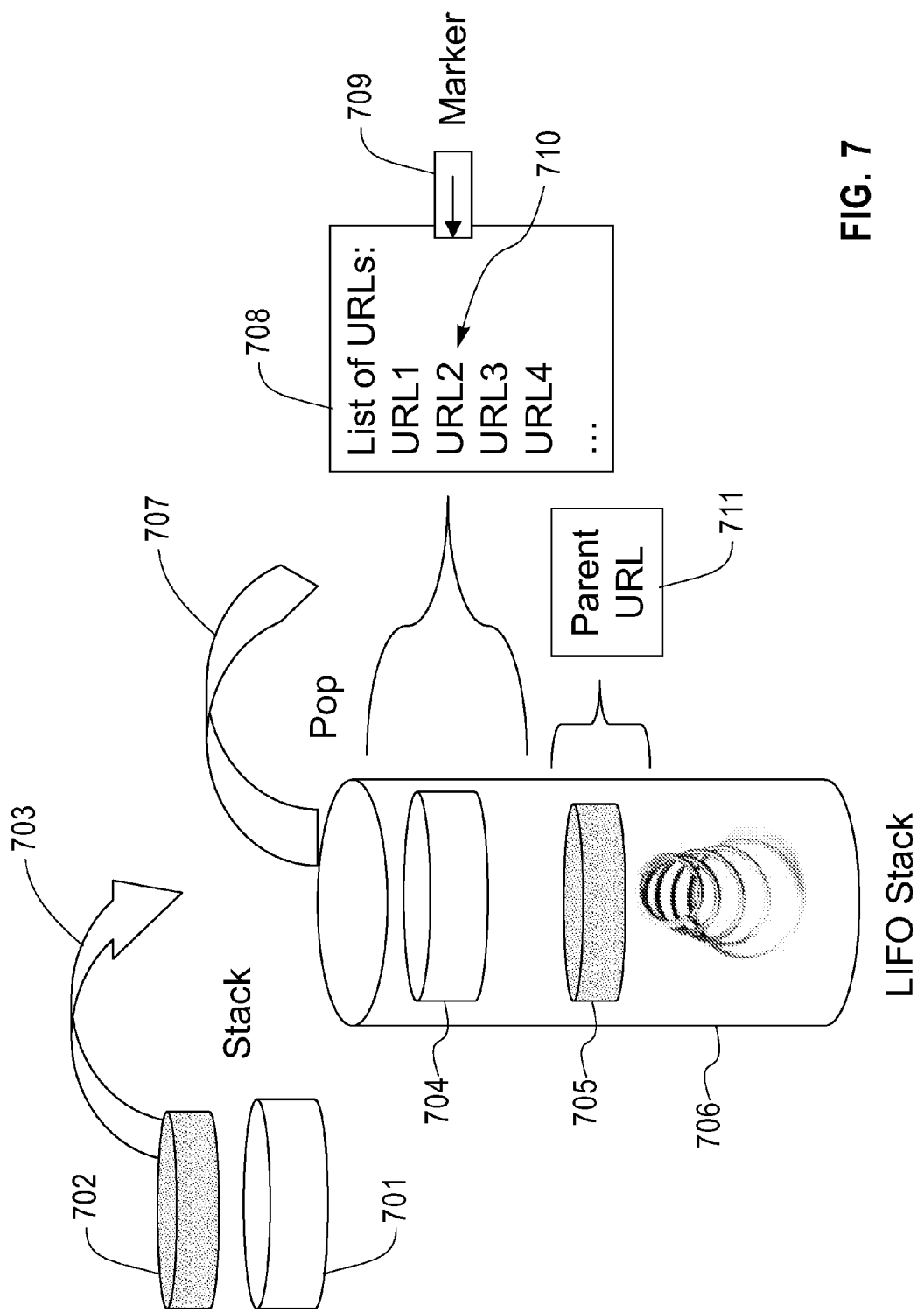
FIG. 7 illustrates stacking the state of the browser and the particular list of URLs that exist on any web page in one embodiment of the present invention.

FIG. 7 illustrates stacking the state of the browser and the particular list of URLs that exist on any web page in one embodiment. It illustrates a LIFO (last in first out) stack operation with state information. The information in the stack 706 in one embodiment includes: 1) the list of hyperlinks (URLs) 708 embedded in the web page currently being browsed, along with a pointer 709 that tracks the selection of the URL 710 to display, and 2) the URL of the ("parent") page 711 from which the list (1) was created. The system and method of the present disclosure, however, is not limited to utilizing the stack operations illustrated in FIG. 7. Rather, other methods may be used to preserve or manipulate information for navigating among different hyperlinks.

Figure 5:
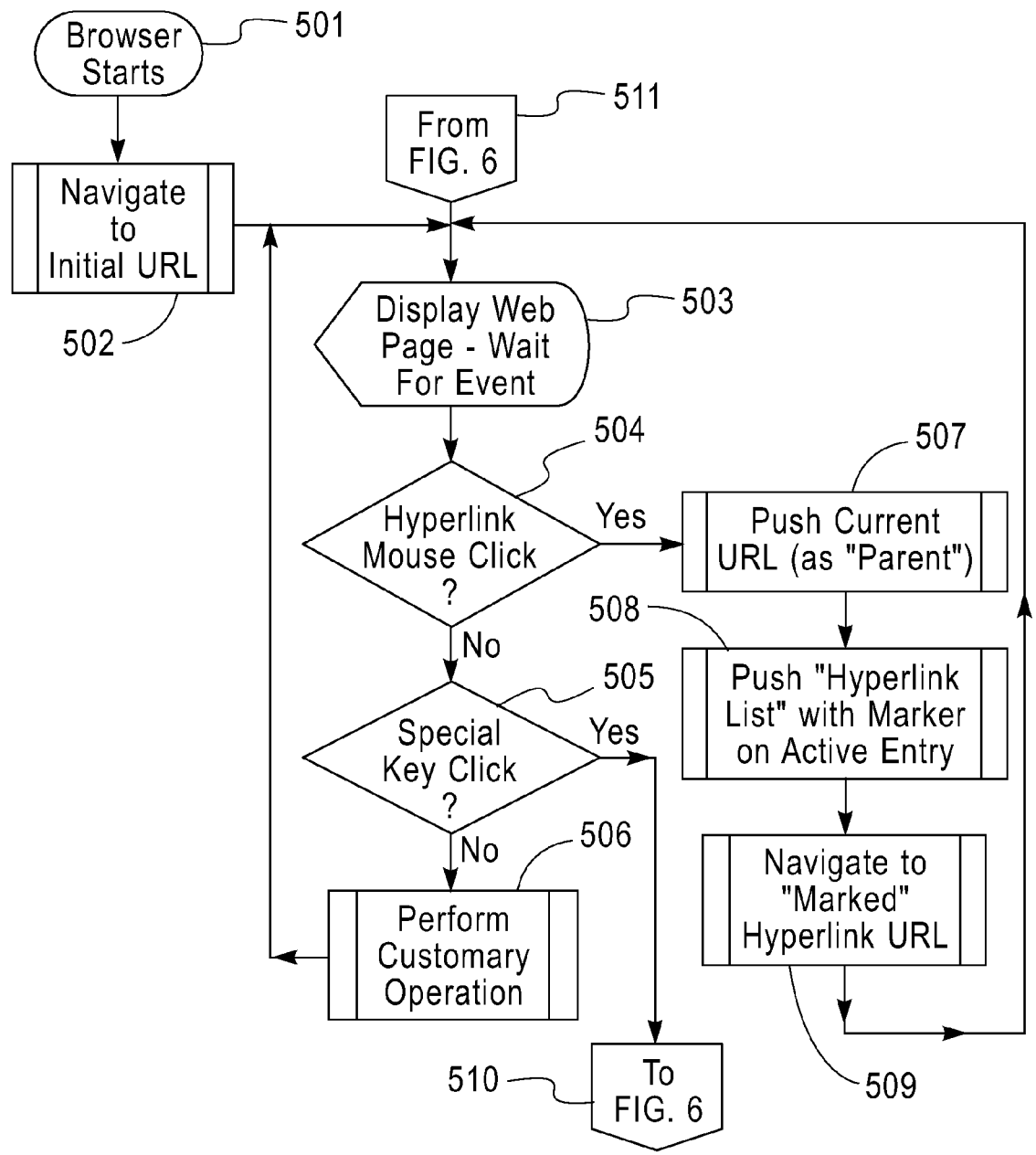
FIGS. 5 and 6 show user interaction processing in one embodiment of the present invention.
Figure 6:
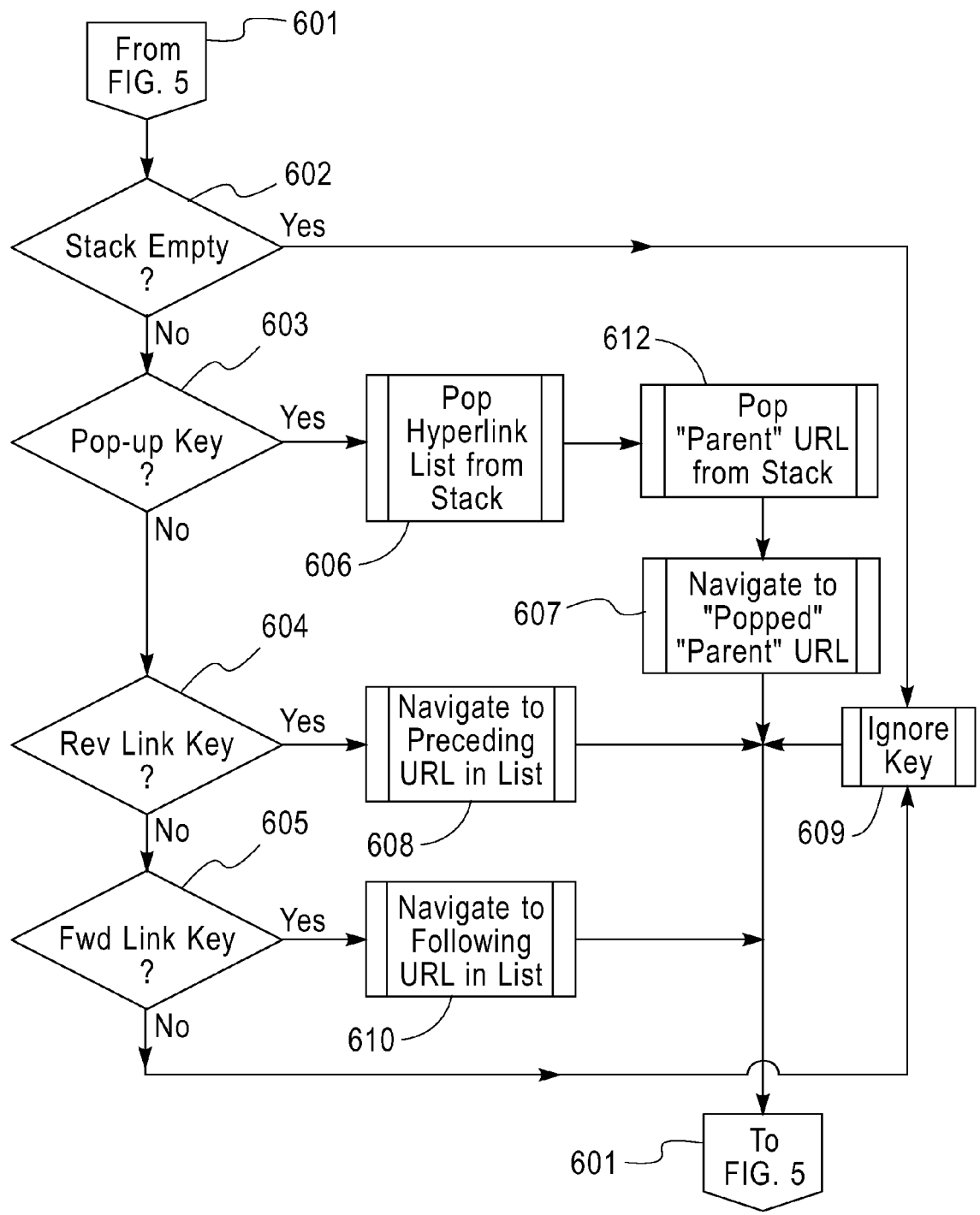

FIGS. 5 and 6 illustrate the system and method of the present disclosure in embodiment. Referring to FIG. 5 with reference to stack operation shown in FIG. 7, an internet browser is invoked 501 and navigates (that is, loads the web page) for the home location 502. Once loaded, the page is displayed and the browser awaits input from the user 503. The user events may comprise largely keyboard or mouse operations. The present invention is not particularly restricted as to the plurality of user inputs, and may include events not listed herein (example: mouse-over events). Events of interest get filtered as they occur. For example, a mouse click on a hyperlink 504 invokes the pushing 702, 703 of the URL 711 of the currently displayed web page 507 (designated as Parent URL) onto a LIFO stack 706. Next a list is formed for all hyperlinks identified on the page, and the list 708, along with a marker 709 as to the selected entry 710 is pushed onto the stack 508, 701, 703. Although both the Parent URL 705 and the List 704 are in the stack, the means described here still can access these without removal from the stack. Next, the internet browser is made to navigate to the selected (also, "marked") hyperlink URL 509 and displays that page 503.

If the input 503 is not a hyperlink mouse click 504, but is one of the assigned special key assignments 505, then a filtering process is done as shown in FIG. 6, beginning with entry at 601. First, for example, if the stack 706 is empty 602, then the key is ignored 609 and the process exits at 611 with resumption of waiting for an input event at 503.

If the stack is not empty 602, the following processing may occur in one embodiment:

1. If it is the link pop-up key 603, then at 606, the latest list 704 in the stack is popped 707 and discarded. Then, at 612, the Parent URL 705 (also annotated as 711 in FIG. 7) is popped 707 and used as the target URL at 607 for browser navigation at 503 (via 611 shown in FIG. 6 and 511 shown in FIG. 5). The web page is loaded and displayed and further events are awaited 503.
2. If it is the reverse link key 604, the marker 709 is moved to an earlier entry (with wrap-around) and that hyperlink URL is navigated to at 608. As before, the web page is loaded and displayed and further events are awaited at 503.
3. If it is the forward link key 605, the marker 709 is moved to a later entry (with wrap-around) and that hyperlink URL is navigated to at 610. As before, the web page is loaded and displayed and further events are awaited at 503.
4. As customary in the art, the condition that the key is misidentified 605 in one embodiment may result in it simply being ignored 609. The process continues awaiting user input 503.

Assigned keys need not be limited to pop-up, reverse or forward keys. For example, other keys may be assigned to navigate to various URLs on the URL list 708. For instance, there may be assigned a specific key to navigate to a specific URL on the list, etc. Referring back to FIG. 3, other events invoked at 503 are processed customarily at 506.

The present invention is not limited to the specifics of a web browser page layout. For example, there can be tabbed bodies of web pages and other navigational aids which in no way encumbers the mode and application of the present invention. Hyperlinks as referred to herein may comprise text or graphic areas that provide navigation results when activated. The present invention is not dependent on the mode or form of hyperlinks, including those that may be indirectly invoked via the execution of code steps embedded in web pages. The present invention is not dependent on whether one hyperlink is necessarily grouped with other hyperlinks of similar form, hence potentially similar interest. These are aesthetic dependencies and also somewhat determined by the web page author in anticipation for what hyperlinks may be of interest. In the present disclosure, clicking a hyperlink is identical in concept to activating a hyperlink. The present invention is not dependent on the use of any particular pointer method at the user's disposal. The present invention is not limited to only web content. It applies equally to any hypertext documentation reader, thus applicable to any document containing embedded links that when activated, causes a jump to the corresponding target.

Figure 4:
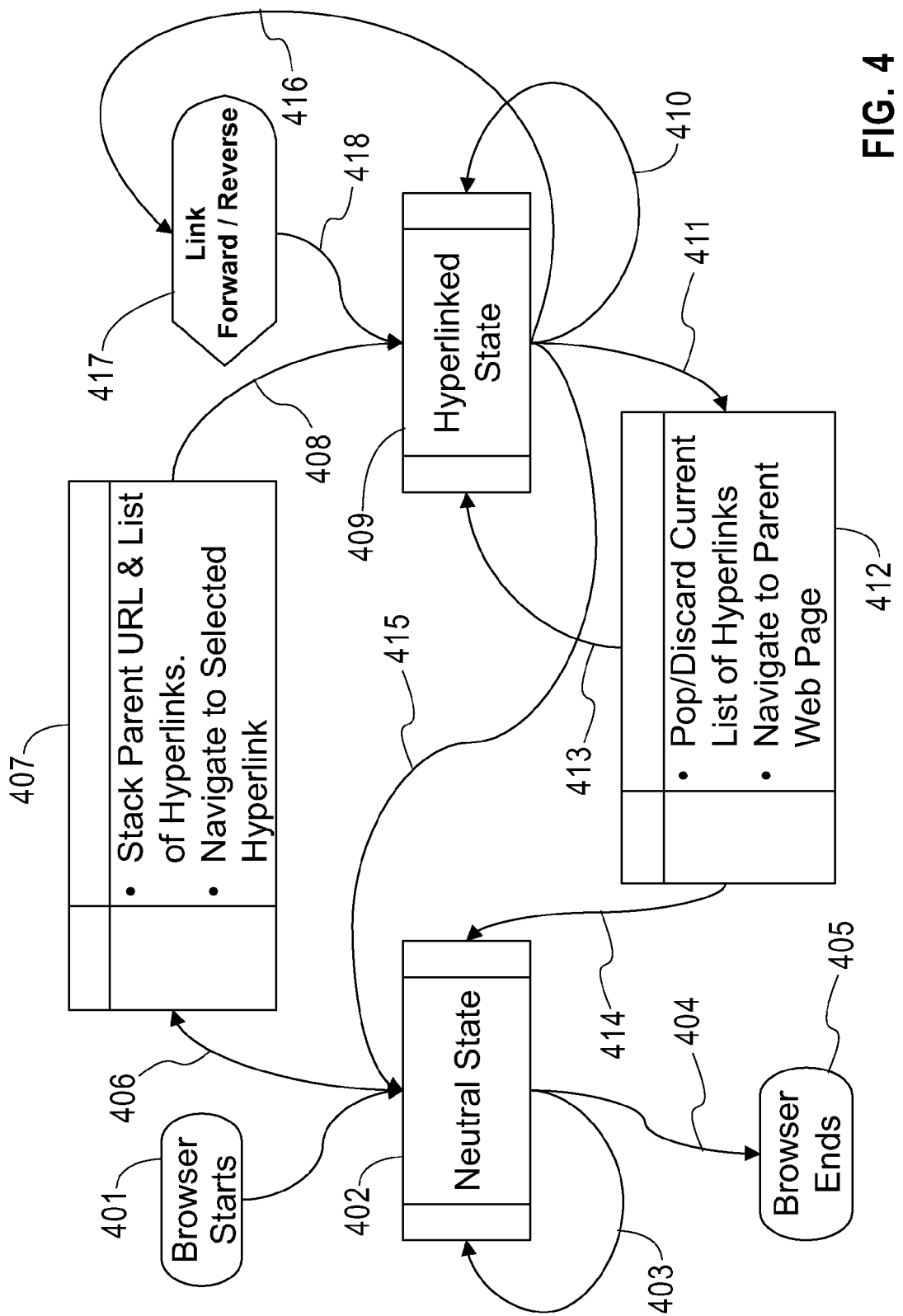
FIG. 4 shows a state transition diagram of the present disclosure in one embodiment wherein the states comprise browsing an entry of a list of hyperlinks or no browsing (neutral state).

FIG. 4 is a diagram illustrating a state transition in one embodiment of the present disclosure. Upon activation 401 the browser starts and enters a "neutral state" devoid of remembered prior links as described. The present invention is not limited to this case. For instance, an embodiment may include a stateful restoration of a web page. In addition, including the drilldown into links followed can be a useful and powerful feature. It is assumed that the browser displays some web page in the neutral state 402 and thus will remain there until either the user quits 404 and it terminates 405 or some interaction or process 406 occurs other than the non-navigation events 403. Given that navigation by following a hyperlink occurs 406, the browser saves the relevant hyperlinks into a LIFO stack 706 of the current (parent) web page 702 at 407. The state transitions 408 to a condition of being in a hyperlinked state 409. The hyperlinked state in one embodiment is characterized by the presence of the parent URL 705 and the list of hyperlinks 704 on a LIFO stack 706. Just as described in the neutral state 402, there can be non-link interactions or processes 410 which preserve the hyperlinked state. For example, a user can interact with the dashboard and cause a jump to a direct URL 415 hence returning the browser to a neutral state, showing a new web page. A user may choose to link to an adjacent link, that is another hyperlink from the parent page. This excursion 416 allows navigating to an adjacent link 417, thus maintaining the hyperlinked state 418 transition to 409. Other means can provide the excursions to the forward/reverse links. The present invention is not limited as to how the invocation can occur. For example, the browser can contain an automatic "screen show" feature to invoke the excursions in some manner, just as easily as if done by human interaction. Aside from ending the browser program, it could be expected that the user leaves the hyperlinked state either to simply "popup" 707, of the current hyperlinked state by popping and discarding the List 704, and then popping and using the Parent URL 705 to reload the browser, via transition 411, 412. If the stack still contains at least one Parent URL and List, the transition 413 allows continuation of the hyperlinked state 409. Otherwise, there is a reversion 414 to the neutral state 402, wherein the browser awaits input for example, from the user or an automated process. Further, there can be actions that perpetuate the neutral state 403 without evoking the selection of a hyperlink 406, and the browser program can be terminated 404, 405.

Figure 8:
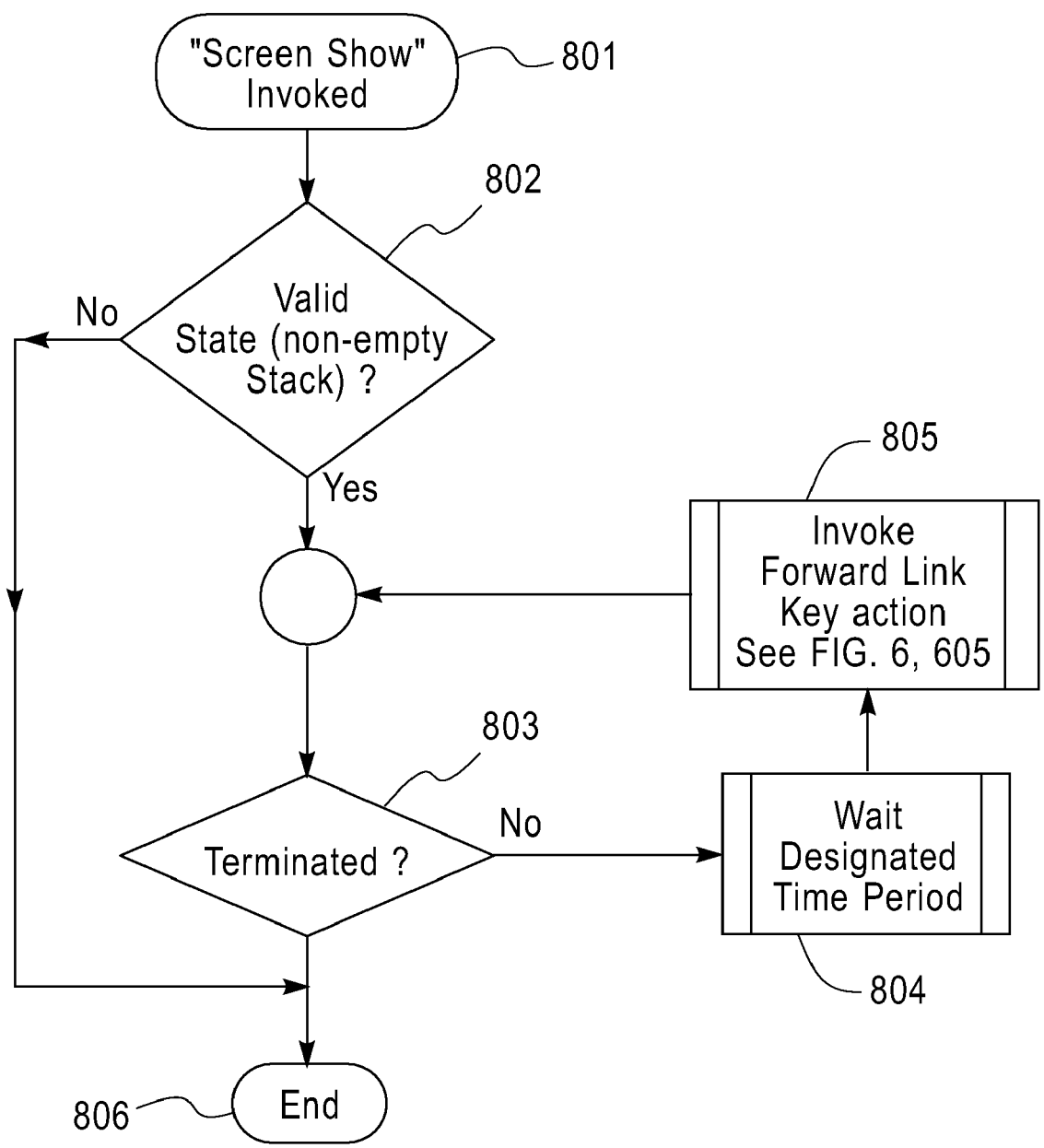
FIG. 8 illustrates an automatic "screen show" function in one embodiment of the present invention.

FIG. 8 is a diagram of the "screen show" mechanism of navigating to hyperlinked documents. Given invocation, while the prior-described apparatus is in the hyperlinked state (i.e., there is a Parent URL, and a list currently in the non-empty LIFO stack 706, processing begins at 801. At 802, the valid state of the program apparatus is verified, and if the state is not valid, for example, by checking whether the stack is empty, the invocation is not started but terminated at 806. However, if verified, then processing enters a looping state wherein a check is made for an event that signifies "screen show" termination 803. While looping, the following processing steps occur in one embodiment: 1) A time delay for processing is performed, thus allowing for the observer to see the screen without intervention 804; and 2) a marker (FIG. 7, 709) is advanced as described for the forward link key action as illustrated in FIG. 6, 605. The process continues with resumption of termination test 803, repeating until signaled or until the program itself is terminated. In one embodiment, the screen show may terminate at the end of the URL list (FIG. 7, 708). In another embodiment, the screen show may continue after encountering the end of the URL list by wrapping around to the beginning of the URL list.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktops, laptops, and servers.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for navigating hyperlinked documents, comprising:

enabling navigating from a document having a plurality of hyperlinks to a document associated with one of said plurality of hyperlinks, said enabling further including forming a list of all hyperlinks identified on the document having a plurality of hyperlinks, and further allocating a pointer to point to a hyperlink of the document associated with one of said plurality of hyperlinks in the list, and pushing a URL of the document having a plurality of hyperlinks onto a stack and pushing the list with the pointer onto the stack; and enabling navigating directly from said document associated with one of said plurality of hyperlinks to another document associated with another one of said plurality of hyperlinks using one or more of a plurality of defined elements, the plurality of defined elements being accessed directly from a window displaying said documents, said enabling navigating directly from said document associated with one of said plurality of hyperlinks to another document associated with another one of said plurality of hyperlinks performed utilizing the list and the pointer in the stack, wherein said another one of said plurality of hyperlinks is not visible from said document associated with one of said plurality of hyperlinks.

2. The method of claim 1, wherein said plurality of defined elements include function keys, one or combination of keys, or one or combination of codes, or combinations thereof.

3. The method of claim 1, wherein said document is a web page.

4. The method of claim 1, wherein said document is hierarchical collections of browsable material.

5. The method of claim 1, further including:

presenting said plurality of hyperlinks and associated plurality of defined elements; and allowing a user to select one or more of the plurality of defined elements for directly navigating to one or more of said plurality of hyperlinks.

6. The method of claim 1, further including:

defining an element for directly returning to said document from one of said plurality of hyperlinks.

7. The method of claim 1, wherein the step of enabling navigating directly from said document associated with one of said plurality of hyperlinks to another document associated with another one of said plurality of hyperlinks includes:

storing a list of the plurality of hyperlinks;

storing a pointer to reference said one of the plurality of hyperlinks in the list;

moving the pointer to reference said another one of the plurality of hyperlinks in response to said one or more of a plurality of defined elements being invoked; and navigating to said another document associated with said another one of the plurality of hyperlinks referenced by the pointer.

8. The method of claim 7, wherein said one or more of a plurality of defined elements includes an element for traversing the pointer forward to reference a next hyperlink entry in the list.

9. The method of claim 7, wherein said one or more of a plurality of defined elements includes an element for traversing the pointer backward to reference a previous hyperlink entry in the list.

10. The method of claim 7, further including:
  storing a link to said document having a plurality of hyperlinks, said one or more of a plurality of defined elements including an element for returning to said document having a plurality of hyperlinks; and
  navigating directly to said document having a plurality of hyperlinks in response to said element for returning being invoked.

11. A non-transitory program storage device readable by machine, tangibly embodying a program of instructions executable by the machine to perform a method of browsing a document, comprising:
  enabling navigating from a document having a plurality of hyperlinks to a document associated with one of said plurality of hyperlinks, said enabling further including forming a list of all hyperlinks identified on the document having a plurality of hyperlinks, and further allocating a pointer to point to a hyperlink of the document associated with one of said plurality of hyperlinks in the list, and pushing a URL of the document having a plurality of hyperlinks onto a stack and pushing the list with the pointer onto the stack; and
  enabling navigating directly from said document associated with one of said plurality of hyperlinks to another document associated with another one of said plurality of hyperlinks using one or more of a plurality of defined elements, the plurality of defined elements being accessed directly from a window displaying said documents, said enabling navigating directly from said document associated with one of said plurality of hyperlinks to another document associated with another one of said plurality of hyperlinks performed utilizing the list and the pointer in the stack,
  wherein said another one of said plurality of hyperlinks is not visible from said document associated with one of said plurality of hyperlinks.

12. A non-transitory program storage device of claim 11, wherein said plurality of defined elements include function keys, one or combination of keys, or one or combination of codes, or combinations thereof.

13. A non-transitory program storage device of claim 11, wherein said document is a web page.

14. A non-transitory program storage device of claim 11, wherein said document is hierarchical collections of browsable material.

15. A non-transitory program storage device of claim 11, further including:
  presenting said plurality of hyperlinks and associated plurality of defined elements; and
  allowing a user to select one or more of the plurality of defined elements for directly navigating to one or more of said plurality of hyperlinks.

16. A non-transitory program storage device of claim 11, wherein the step of enabling navigating directly from said document associated with one of said plurality of hyperlinks to another document associated with another one of said plurality of hyperlinks includes:
  storing a list of the plurality of hyperlinks;
  storing a pointer to reference said one of the plurality of hyperlinks in the list;
  moving the pointer to reference said another one of the plurality of hyperlinks in response to said one or more of a plurality of defined elements being invoked; and
  navigating to said another document associated with said another one of the plurality of hyperlinks referenced by the pointer.

17. A non-transitory program storage device of claim 16, wherein said one or more of a plurality of defined elements includes an element for traversing the pointer forward to reference a next hyperlink entry in the list.

18. A non-transitory program storage device of claim 16, wherein said one or more of a plurality of defined elements includes an element for traversing the pointer backward to reference a previous hyperlink entry in the list.

19. A method for navigating hyperlinked documents, comprising:
  enabling navigating from a document having a plurality of hyperlinks to a document associated with one of said plurality of hyperlinks, said enabling further including forming a list of all hyperlinks identified on the document having a plurality of hyperlinks, and further allocating a pointer to point to a hyperlink of the document associated with one of said plurality of hyperlinks in the list, and pushing a URL of the document having a plurality of hyperlinks onto a stack and pushing the list with the pointer onto the stack; and
  enabling automatically navigating between a plurality of documents associated with the plurality of hyperlinks respectively without returning to said document having a plurality of hyperlinks, the plurality of defined elements being accessed directly from a window displaying said documents, said enabling navigating directly from said document associated with one of said plurality of hyperlinks to another document associated with another one of said plurality of hyperlinks performed utilizing the list and the pointer in the stack,
  wherein said plurality of hyperlinks are not visible from said document associated with one of said plurality of hyperlinks.

20. A system for browsing a document, comprising:
  a processor;
  means for enabling navigating from a document having a plurality of hyperlinks to a document associated with one of said plurality of hyperlinks, said enabling further including forming a list of all hyperlinks identified on the document having a plurality of hyperlinks, and further allocating a pointer to point to a hyperlink of the document associated with one of said plurality of hyperlinks in the list, and pushing a URL of the document having a plurality of hyperlinks onto a stack and pushing the list with the pointer onto the stack; and
  means for enabling navigating directly from said document associated with one of said plurality of hyperlinks to another document associated with another one of said plurality of hyperlinks using one or more of a plurality of defined elements, the plurality of defined elements being accessed directly from a window displaying said documents, said enabling navigating directly from said document associated with one of said plurality of hyperlinks to another document associated with another one of said plurality of hyperlinks performed utilizing the list and the pointer in the stack,
  wherein said another one of said plurality of hyperlinks is not visible from said document associated with one of said plurality of hyperlinks.

\* \* \* \* \*